Dec. 7, 1926.

S. STUART 1,609,326

AUTOMATIC INTERLOCKING DRIVE CLUTCH FOR CAN MAKING AND OTHER MACHINES

Filed Feb. 4, 1925  9 Sheets-Sheet 1

SYDNEY STUART
INVENTOR
By
his Attorney

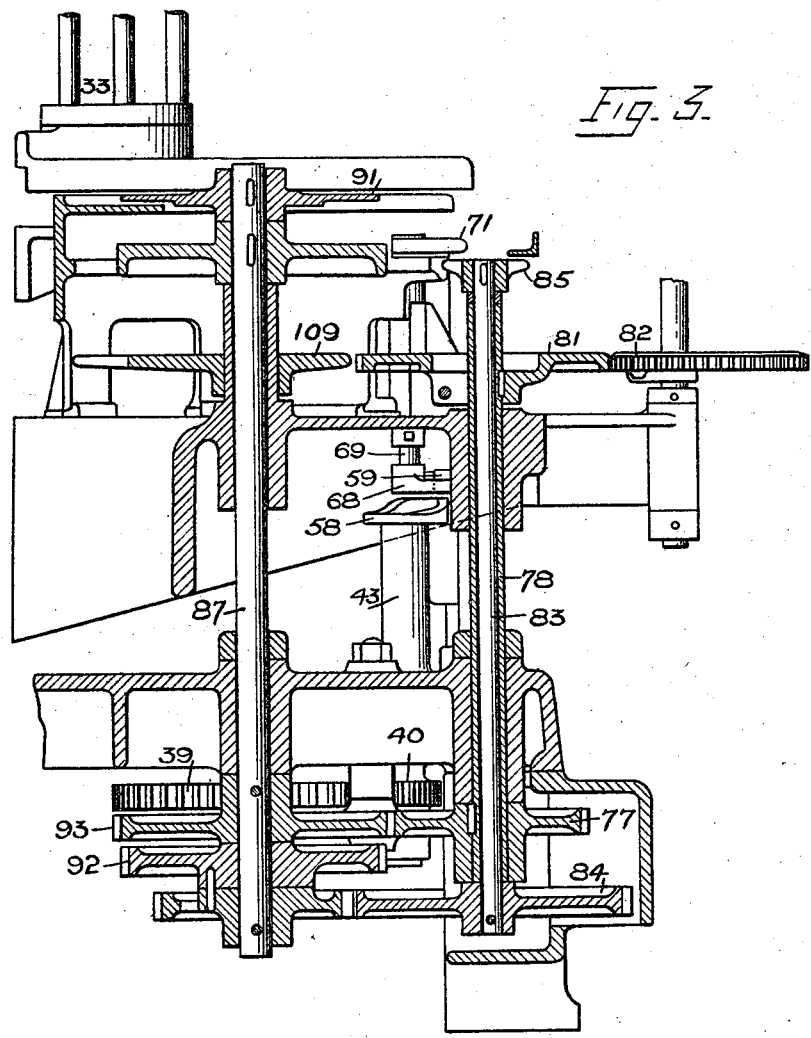

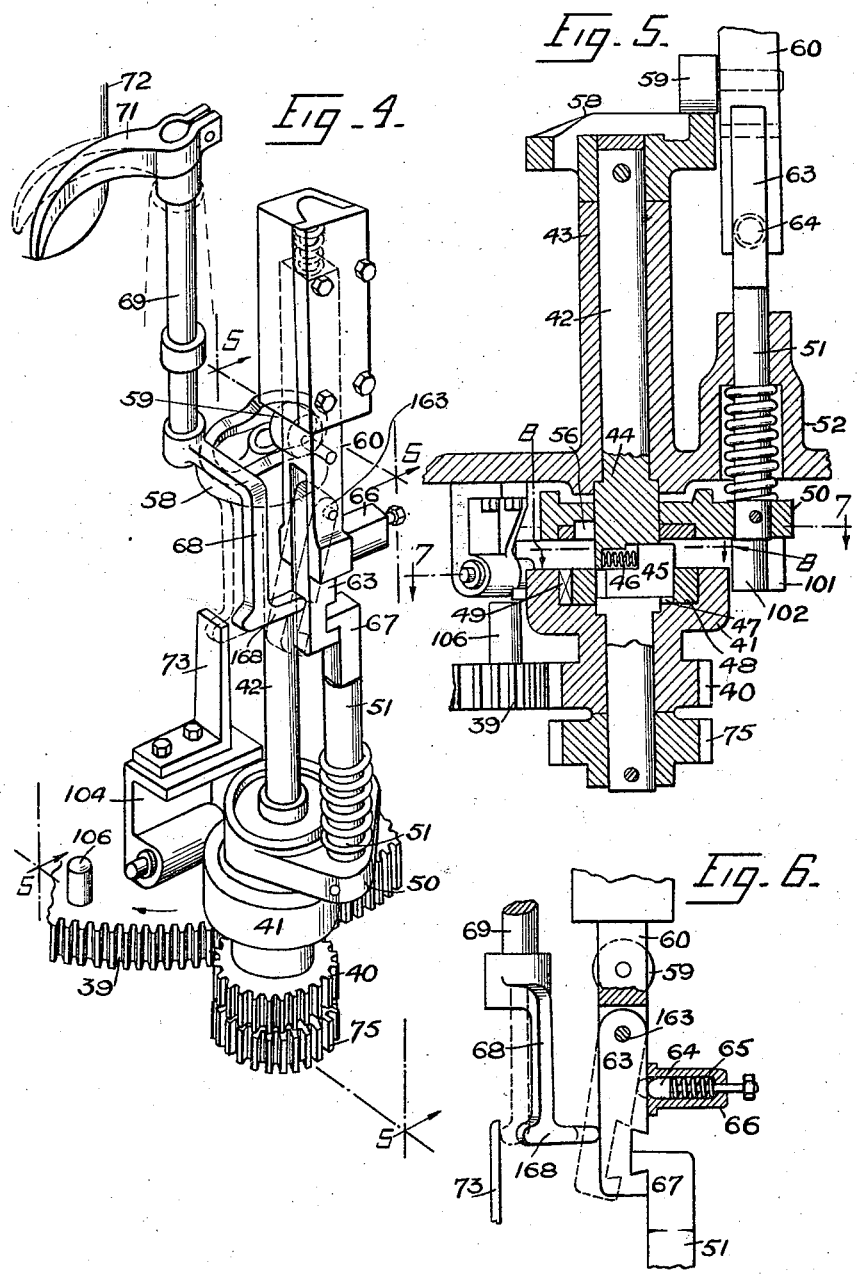

Dec. 7, 1926.
S. STUART
1,609,326
AUTOMATIC INTERLOCKING DRIVE CLUTCH FOR CAN MAKING AND OTHER MACHINES
Filed Feb. 4, 1925  9 Sheets-Sheet 5
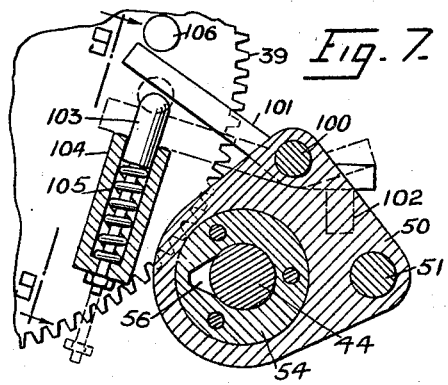
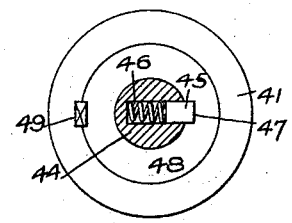
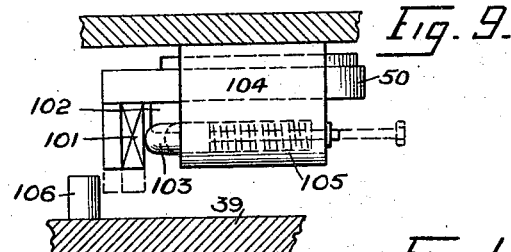
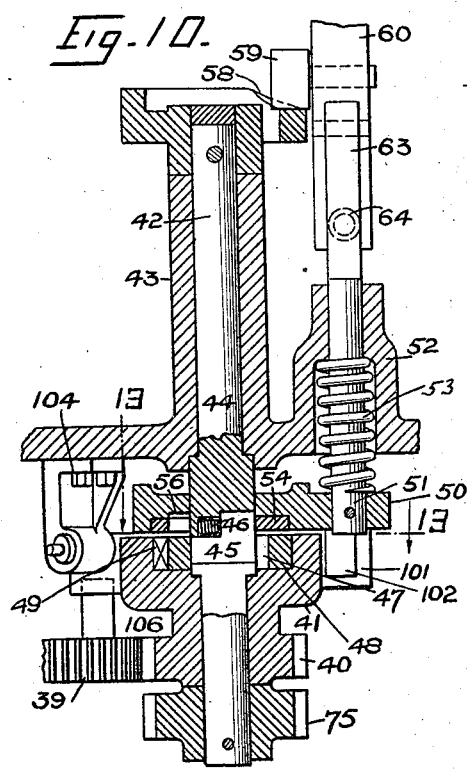
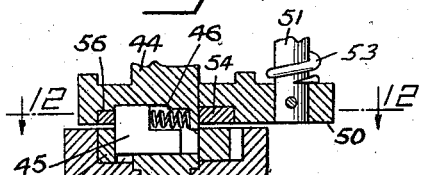
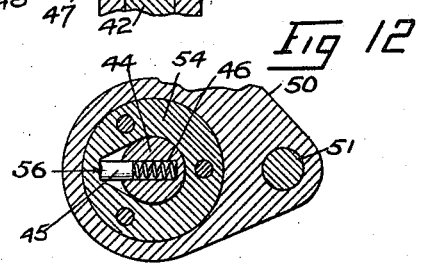
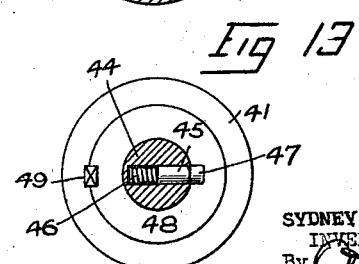
SYDNEY STUART
INVENTOR
By
his Attorney

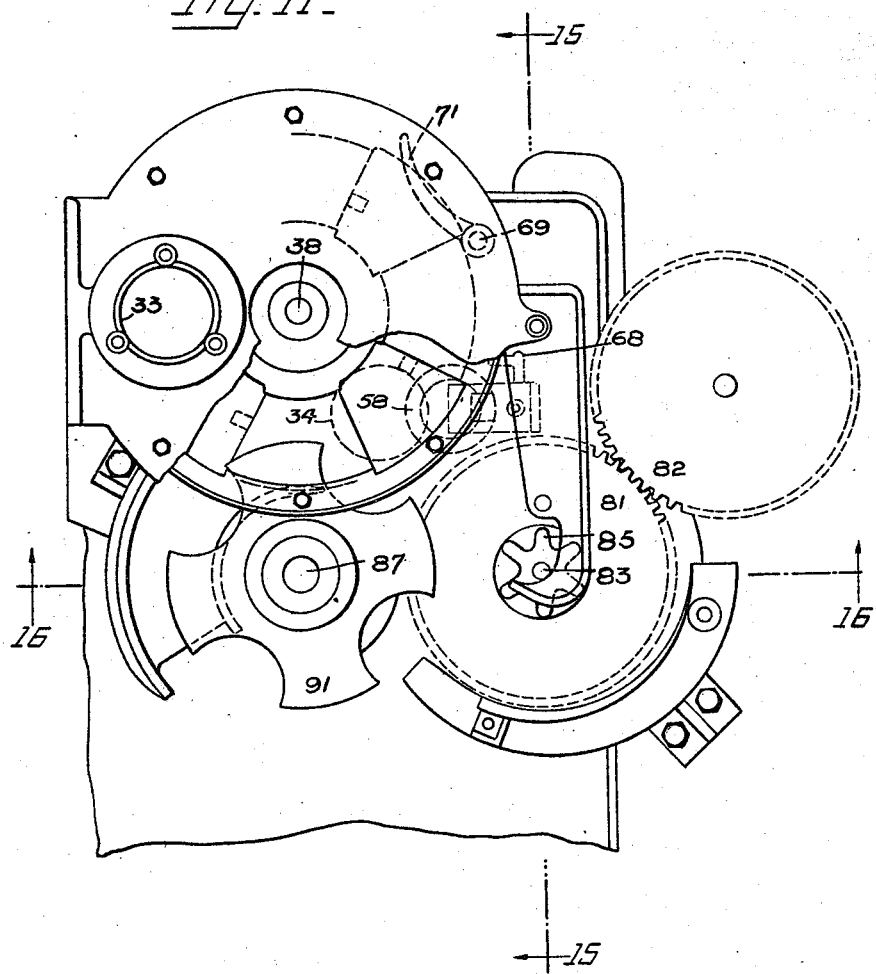

Dec. 7, 1926.
S. STUART
1,609,326
AUTOMATIC INTERLOCKING DRIVE CLUTCH FOR CAN MAKING AND OTHER MACHINES
Filed Feb. 4, 1925
9 Sheets-Sheet 7

SYDNEY STUART
INVENTOR
By
his Attorney.

Dec. 7, 1926.
S. STUART
1,609,326
AUTOMATIC INTERLOCKING DRIVE CLUTCH FOR CAN MAKING AND OTHER MACHINES
Filed Feb. 4, 1925  9 Sheets-Sheet 9
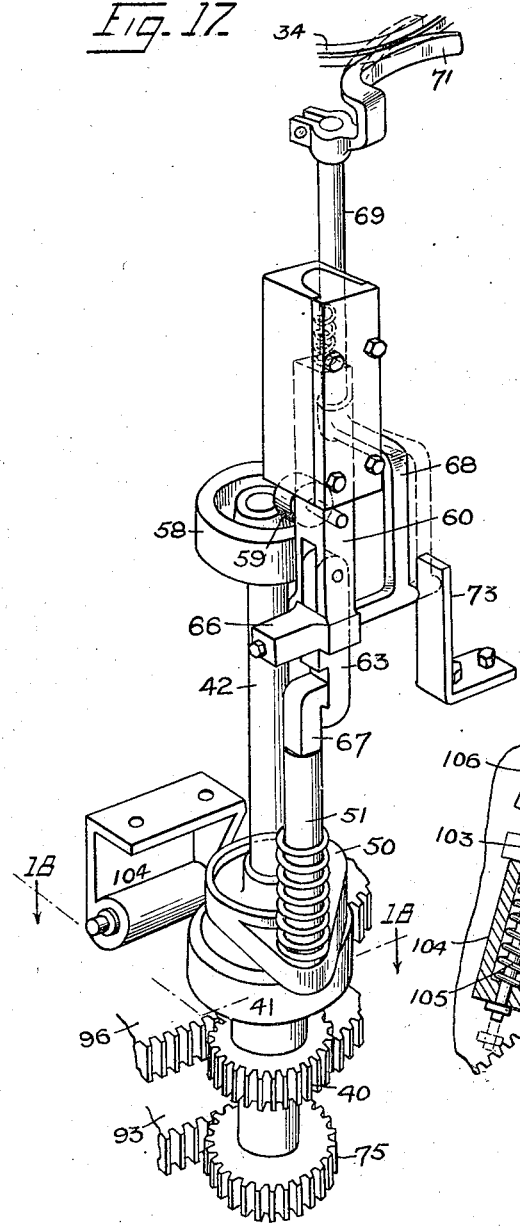
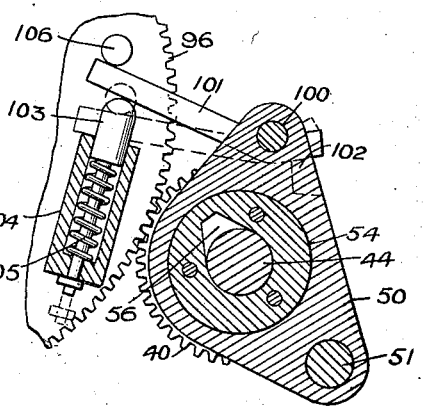
SYDNEY STUART.
INVENTOR
By
his Attorney Patented Dec. 7, 1926.

1,609,326

UNITED STATES PATENT OFFICE.

SYDNEY STUART, OF LEICHHARDT, NEAR SYDNEY, NEW SOUTH WALES, AUSTRALIA, ASSIGNOR TO JOHN HEINE & SON LIMITED, OF LEICHHARDT, NEAR SYDNEY, AUSTRALIA, A REGISTERED COMPANY.

AUTOMATIC INTERLOCKING DRIVE CLUTCH FOR CAN-MAKING AND OTHER MACHINES.

Application filed February 4, 1925. Serial No. 6,760, and in Australia November 14, 1924.

This invention relates to interlocking clutches usable in machines for making sheet metal cans, machines for charging cans or other vessels with product to be enclosed therein, machines for applying sealing solution to cans, and machines for other purposes.

Can making machines include mechanism for feeding in formed can bodies one by one, and in timing therewith feeding in formed caps one by one and for bringing the bodies and the caps to other elements in the machine in which the caps are seamed to the body ends. Can filling machines include an element for bringing the cans successively to a filling spout and dwelling or retarding their movement momentarily whilst they are passing under the spout in order to allow adequate time for the filling operation. Many other machines include two distinct mechanical elements which must be arranged and controlled so as to function in cooperation. In all such machines now known, certain operating difficulties arise when one of the elements functions irregularly, and the object of the present invention is to provide automatic drive clutch controlling means for ensuring mechanical coordination of two elements in a machine so that if one of them ceases to function the functioning of the other one will be arrested until the former resumes operation. For example in the case of a can capping machine the invention provides means whereby the feed of caps is arrested (or in the case of filling machines whereby the filling is arrested) when there occurs a break in the continuity of supply of bodies, or conversely to arrest the operation of the body feeder when there is interruption in the feed of caps. The invention will be described as embodied in a can body capping machine, and its applicability to other machines will be understood from that description.

The automatic clutch control means operate to arrest the movement of the lid supply element only whilst a miss occurs in the feed of bodies, and conversely to arrest the supply of bodies only whilst a miss occurs in the feed of caps. Similarly in the case of filling machines these means operate to arrest the delivery of product when a can is missing from the train of cans passing through the machine but to re-establish the delivery as soon as regular supply of cans through the machine is re-established. In any of these cases if the supply of bodies or of caps respectively should run out, the movement of the other feed element will be arrested but the unsupplied element will continue idly in operation until the normal feed condition is re-established; if however only one or more bodies or caps respectively are missing from the trains of bodies and caps passing through the respective feed elements of the machine, the movement of the full element will be arrested until the deficient element has made one or more partial movements and normal supply of feed through it is re-established, whereupon both elements will again be brought into operation simultaneously. So also in the case of filling machines the supply of product will be recommenced automatically after a miss in the feed of cans as soon as a can comes to place to receive the product from the delivery spout.

The invention consists essentially in fitting trigger arms in the path of movement of the can bodies and can caps or either of them (or in the case of other machines, in the path of movement of other articles), utilizing the movement of these triggers, which occurs when the caps or bodies respectively trip them when passing them in the race, to cause the engagement of a clutch in the feed driving mechanism of the other element, and conversely, when the triggers or either of them remain inoperative automatically holding the clutch open so that operation of the element whose movement is required to be arrested will no longer be possible for the reason that drive is not transmitted to it until normal feed through the unsupplied element has been restored.

The invention is therefore independent of the particular type of machine in which it may be embodied, provided, however, that it includes as part of its structure feed mechanism in which the cans and the caps (or other articles) are brought into the machine through independent feeders.

In can capping machines embodying the invention which I have constructed, the feeder devices are of a known type comprising rotary tables with means for taking formed caps from a stack at timed intervals and feeding them one by one into the machine, and for receiving formed open can bodies and feeding them synchronously with the caps into the machine in which subsequently the caps are fixed on the bodies.

The accompanying drawings illustrate only those parts of a can capping machine which are necessary for the explaining of the invention.

Fig. 3 is a vertical section on the plane 3—3 Fig. 1;

Fig. 4 is a perspective view of the interlocking clutch mechanism which is controlled by trigger arm movement;

Fig. 5 is an enlarged fragmentary vertical section on the plane 5—5 Fig. 4;

Fig. 6 is a fragmentary sectional elevational view explanatory of the operation of the clutch lock and trigger controlling mechanism; this detail refers to the parts illustrated in the upper portion of Fig. 4;

Fig. 7 is a horizontal section on the plane 7—7 Fig. 5;

Fig. 8 is a fragmentary plan and horizontal section of the clutch in engaged position;

Fig. 9 is a fragmentary elevational view taken from the position 9—9 Fig. 7;

Fig. 10 is a vertical section similar to Fig. 5. Fig. 5 shows the clutch engaged (see also Fig. 8), whilst Fig. 10 shows the clutch disengaged (see also Fig. 13);

Fig. 11 is a fragmentary vertical section through the clutch showing it disengaged (see also Fig. 10); and Fig. 12 is a horizontal section on the plane 12—12 Fig. 11;

Fig. 13 is a view similar to Fig. 8 showing the clutch disengaged.

Figure 15:
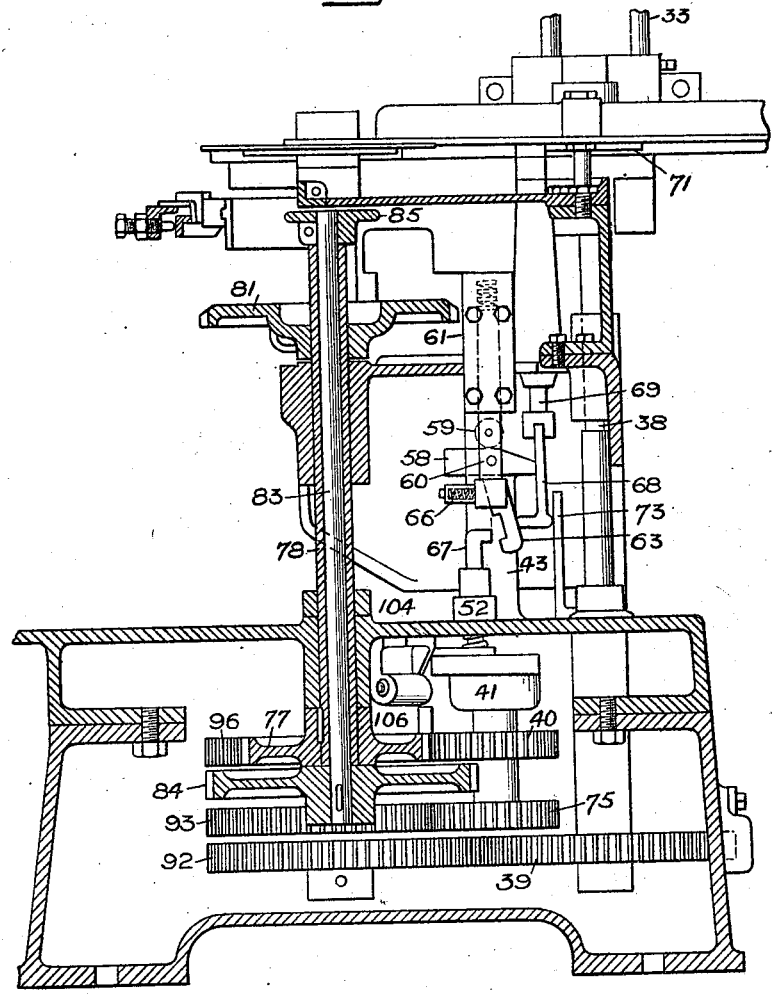
Figure 16:
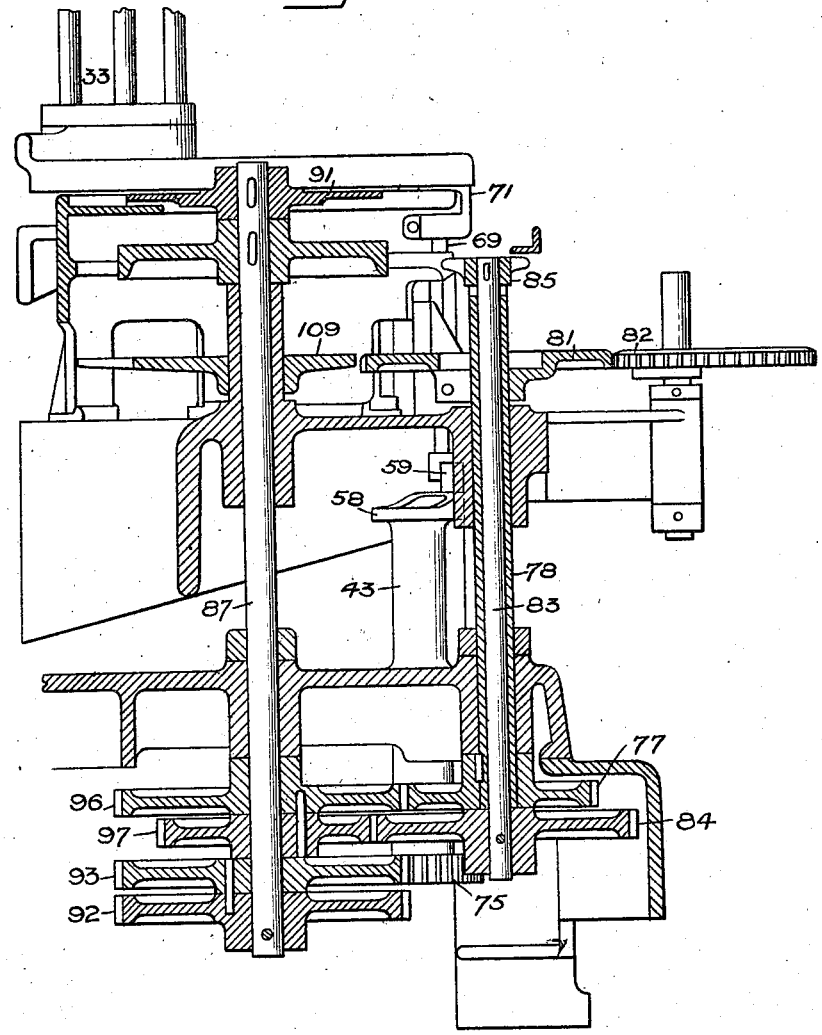

The drawings numbered Figs. 1 to 13 refer to the arrangement in which the clutch control is arranged for arresting the feed of caps whilst there is an interruption in the supply of can bodies. The following figures show substantially the same mechanical parts in an adapted arrangement in which the feed of bodies is arrested whilst the regular supply of caps is interrupted. It is to be understood that both these mechanisms may be fitted on one machine so as to obtain complete interlocking of the feeders by arresting the motion of either feed element of it whenever any interruption occurs in the continuity of the feed in the other element of it;

Fig. 14 is a top plan of the feeder mechanism;

Fig. 15 is a vertical section on the plane 15—15 Fig. 14;

Fig. 16 is a vertical section on the plane 16—16 Fig. 14;

Fig. 17 is a perspective elevational view showing the trigger controlled clutch interlocking mechanism; and Fig. 18 is a horizontal section on the plane 18—18 Fig. 17.

Referring to Figs. 1 to 13;

The can bodies pass over the rotary disc body feed table 82 the edge of which is spur toothed and intergears with the spur toothed edge of the body feed table 81. The tables 81 and 82 are rotated at a faster rate than is necessary to carry the bodies (indicated in dotted lines 72) through a race which is formed on the surface of the table 81 by an inner fence 107 and an outer fence 108. The timing of the feed of can bodies 72 is controlled by the star wheel 85. A train of open top cans (or bottles) being supplied to the table 81 is progressed through the race by the rotational movement of the table. The fingers of the star wheel 85 do not extend into the entering part of the race. But the race being eccentric to the star wheel axis the star wheel fingers project into the latter portion of the raceway. The leading can (or bottle) in the train entering the race is crowded up against that one of the star wheel fingers which has sufficiently projected beyond the inner fence of the race to obstruct its free movement through the race. As the star wheel fingers respectively pass that position the cans (or bottles) are taken in the bays between its fingers and they are delivered into the machine whilst embraced in a locating bay between the star wheel fingers and therefore in correctly timed relation for the machine operations. Each can (or bottle) is thus brought into the machine in correct register and timing. The incoming bodies 72 pass successively within range of the cruciform placer wheel 91, which is timed so that one of its bays comes to position to embrace one side of the incoming can body 72 as it is about to pass out of the race between the fences 107—108. The movement of the body forward upon the table 81 is controlled by the rate of rotation of the placer wheel 91, and the body is moved forwardly whilst held by the placer wheel 91 and its distant side is caused to contact with the fence 191; thence the bodies are traversed over the assembler table 109.

71 is a trigger finger mounted on the top end of a vertical rock spindle 69. This trigger finger is disposed to set normally in the path of movement of the can bodies 72 as they pass over the rotary table 81 towards the receiver table 109. The trigger spindle 69 carries a cranked offset arm 68 on its lower ends. The toe piece 168 on the bottom end of the arm 68 takes behind a swinging latch jaw 63 which is pivotally mounted at 163 in slotted jaws in a vertically oscillatable rod 60. So long as the toe piece 168 bears inward against the latch jaw 63 it holds it inward in the position shown in the full lines in Figs. 4 and 6, that is to say, in engagement with the clutch operating rod 51. This happens only whilst and so long as pressure is applied to the trigger 71 by a passing can body 72. When a can body is not in contact with the trigger 71 the latch jaw 63 is forced to the disengaged position shown in dotted lines in Figs. 4 and 6 by means of the plunger 64 which is acted upon by a spring 65, this spring being housed in a tubular casing 66 on the lower part of the rod 60. In the inner or engaged position which is shown in full lines, the latch 63 engages the check or hook 67 on the top end of the clutch operating rod 51. Only whilst the trigger 71 is pressed by a can body and the toe piece 168 thus forced inward and the mouthed latch 63 forced over to engagement position with the member 67 is it possible for reciprocating movement of the rod 60 to be communicated to the clutch operating rod 51. The object of this arrangement is to procure engagement of the clutch to connect the drive to the cap feeder only whilst a can body is incoming to receive a cap from the cap feeder. 73 is a back stop which limits its outward movement of the offset cranked arm 68, and consequently limits the inner position of the trigger 71 whilst it is not being acted upon by a can body. Reciprocating movement is applied to the oscillator rod 60 by means of a cam 58 which is fixed on the top end of the clutch spindle 42. This spindle is maintained in constant rotation by the gear wheel 75 from other parts of the machine.

59 is an anti-friction roller on an axle which is fixed in and offset laterally from the rod 60. This roller runs on the cam 58. The face of that cam is shaped to apply reciprocating movement in the required range and timing to the rod 60.

45 is a slide key of gnomon shape housed in a key slot in the enlarged cylindrical portion 44 of the clutch spindle 42. 46 is a spring housed in the same slot and functioning to force the broad portion of the key 45 out of the slot in the spindle. This enlarged portion of the spindle is housed for rotation in a hardened sleeve 48 which is secured by a key 49 concentrically in the clutch head 41. The clutch head is integral with or is permanently attached to a gear wheel 40 which is in mesh with a spur gear 39. Through this gear drive motion is applied to the cap feeder from the spindle 42. 47 is a key slot in the sleeve 48 which is engageable by the clutch key 45. When the clutch key is in the inner (declutched) position (see Figs. 10 and 13) there is no engagement between the spindle 42 and the clutch head 41. Conversely, when the key 45 is engaged to the clutch head, rotary motion is communicated to the wheel 39 through the pinion 40 from the spindle 42 (which is in constant rotation). The key 45 is thus engaged with the key-way 47 whilst the clutch cap 50 is lifted (see Fig. 5) but is disengaged when the clutch cap 50 is in the low position (Figs. 10 and 11). The clutch cap 50 is carried on the bottom end of the clutch operating rod 51 and a spring 53 housed in a casting 52 is arranged to bear on the clutch cap 50 to force it downward. When it is in the down position (see Figs. 10 and 11) it operates to force the key 45 inward and release the spindle 42 from the clutch head 41 and consequently to free the pinion 40. In the clutch the clutch cap is fitted with a segmental liner with a ramped end, in passing over which the clutch key is drawn, but in that case the clutch key is freed for reengagement as soon as it has run over the segment. In the arrangement of the present invention, the liner is a ring with a slope sided notch in it, and the key is released for reengagement only when it is passing this notch whilst the clutch cap is lowered. The disengagement and reengagement of the clutch key is therefore effected only at one certain position in the rotational path of the clutch head. 54 is the hardened fixed bush or liner in the clutch caps; it is a free running fit on the spindle enlargement 44, and 56 is the slope sided notch which is formed in one side of it. This notch is of sufficient dimensions to accommodate the extension portion of the key 45 and is shaped on the sides of it to present angular ramp faces to the sides of that key (see Fig. 12) for the purpose hereinafter explained. The clutch being engaged and the spring 53 operating to push down the cap 50, the bush 54 is caused to bear down on the projecting end of the key 45. When the mouth 56 in the bush 54 comes into register with the projecting end of the key 45 the cap slips down from the position shown in Fig. 5 to the position shown in Fig. 10. As the cap 50 is non-rotatable, the key 45 is caused to be retired as its projecting part runs over the angular faces of the notch in the bush 54, and the key is consequently then forced inward to the position shown in Fig. 10 so that the spindle 42 is thus disengaged from the pinion 40. It is held disengaged by engagement of its upper corner within the wall of the countersunk circular cup in its upper part of the mouthed ring 54. When the cap 50 is again lifted the clutch key 45 will be released and will fly out to the position shown in Fig. 5 and will then re-engage the spindle 42 to the clutch head 41 as soon as it (the key) comes to register with the keyway 47 in the clutch ring 48. The cap picks up the key to retire it only at the register position in which the notch in the bush is held. This clutch device ensures continuous operation of the machine whilst the feed is normal.

Figure 1:
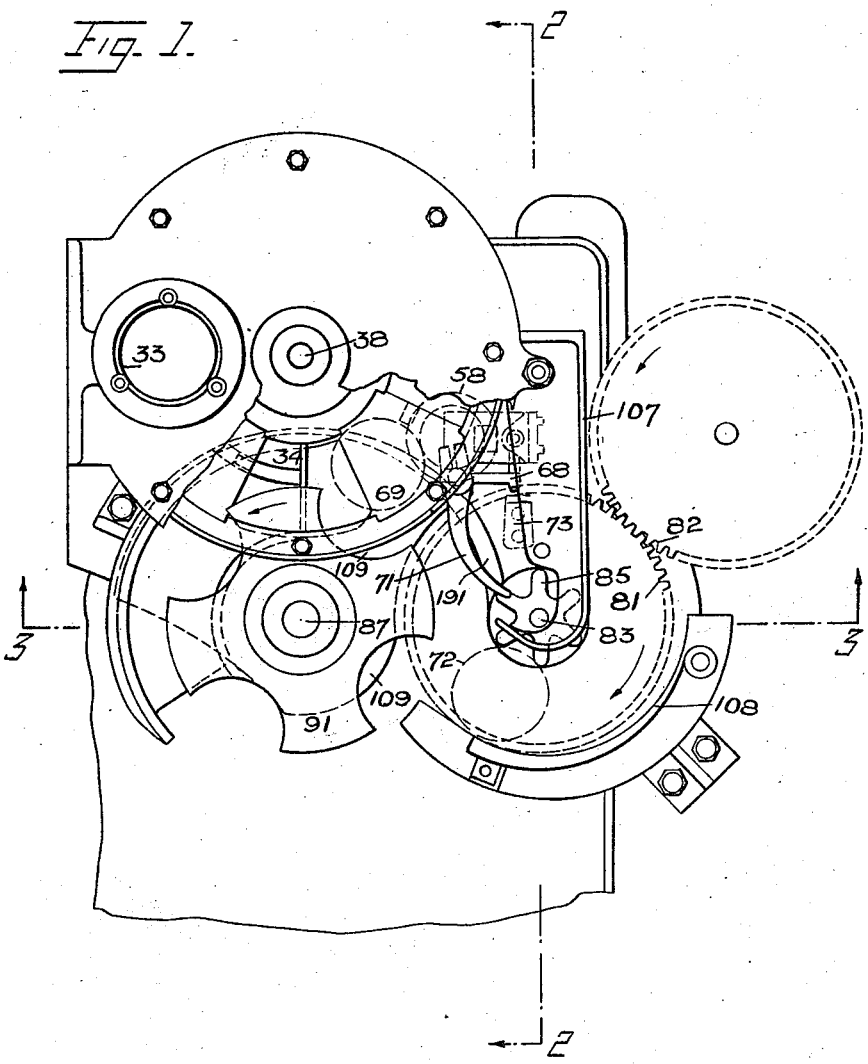
Fig. 1 is a top plan view of the body and cap feeder mechanism.
Figure 2:
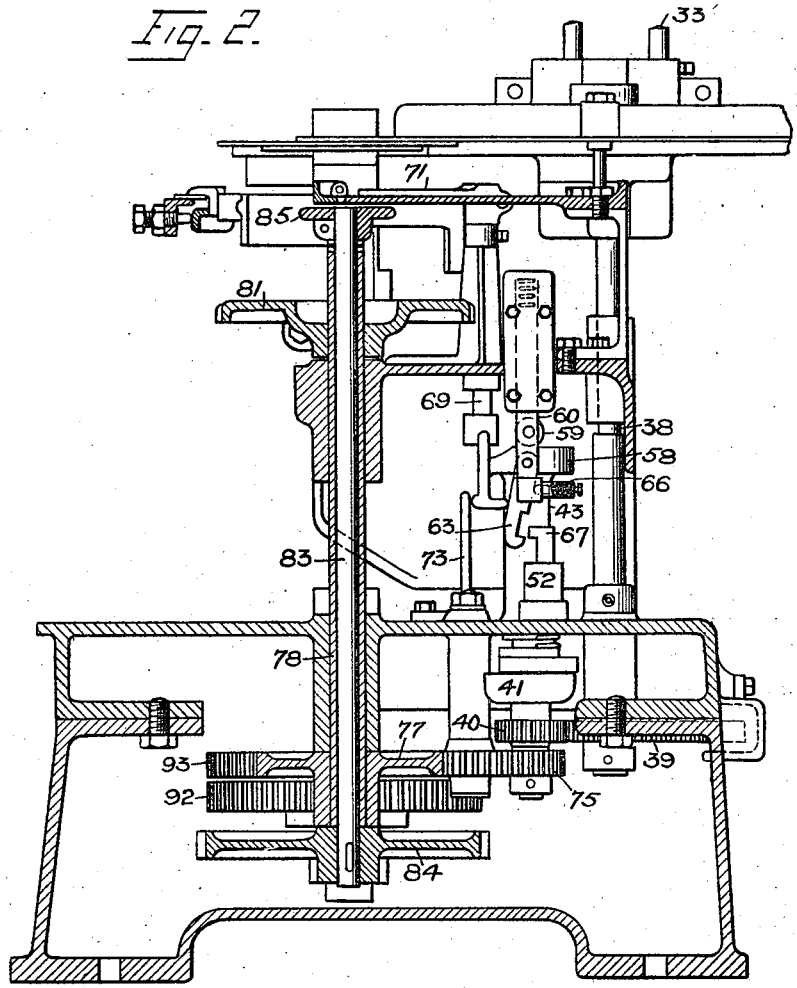
Fig. 2 is a vertical section on the plane 2—2 Fig. 1.

So long as the toe piece 168 of the control mechanism is pressed inward, the latch jaw 63 will be held engaged with the head 67 of the clutch rod 51; consequently, the spindle 42 being in constant rotation and maintaining the cam 58 in revolution, application of reciprocating motion from the oscillating head 60 to the clutch rod 51 and to the clutch cap 50 takes place. When, however, the trigger 71 is not pressed and consequently the toe 168 is in the free position and the latch jaw 63 is disengaged, the clutch cap is not lifted by the rod 60 and the spring 53 acts to hold it down and maintain the key 45 disengaged. The cap feed mechanism is driven through the gear wheel 39, and consequently when the clutch cap 50 is down, resulting from the trigger 71 being free as shown in Fig. 1, driving motion, is no longer transmitted through the pinion 40 to the gear wheel 39 and thence to the cap feed mechanism.

As soon as a can body makes contact with the trigger 71, forcing it outward from the feed race, the toe piece 168 forces in the latch 63. This latch then engages the head 67 of the clutch rod 51 at the bottom stroke position of the rod 60. In the first upward movement effected by the action of the cam 58, the clutch head 50 is lifted and the clutch key 45 is then free to engage the keyway 47. It is driven into the keyway 47 by the spring 46 as soon as it comes to register position therewith and the spindle 42 is thus engaged to the clutch head 41 and consequently to the pinion 40. The drive is then communicated to the cap feeder which is caused to perform a movement in synchronism with the body feeder movement. Thus the action of the cap feeder is interrupted whenever there is not a body coming to receive the cap which is on its way to the assembly table, but the cap feeder is brought into action again immediately a body comes to the appropriate position in relation to the waiting cap at a later time in the rotation of the body feeder.

It is practically important that the arrest of movement of the rotating members consequent on the clutch action shall not take place with great suddenness, and it is necessary that they be brought to stop at correct register positions and not permitted to rotate freely and stop at any accidental position in the course of their rotation. There is a certain momentum in the parts which would cause their motion to continue after the clutch key 45 has been engaged. In order to take up this momentum and also to buffer the stopping of the moving parts to bring them to rest at correct register positions, an automatic braking device is fitted. A casing 104 carried on a bracket on the framing 43 carries in it a plunger buffer 103 which is backed by a helical spring 105, a tail rod being fitted to limit the outward movement of the buffer plunger. Check pins 106 are fitted on the top side of the gear wheel 39. These pins clear the buffer casing 104 in the rotation of the wheel 39. A free lever arm 101 is pivotally mounted on a pin 100 on the clutch cap 50. The back end of this lever takes against a stop 102 on the cap 50 and the lever 101 is fitted so that it has freedom for movement between the full line and the dotted line positions shown in Fig. 7. The buffer plunger 103 contacts with the back of the lever 101 and said lever is brought into the path of the check pin 106 only when the clutch cap is lowered to the position shown in Figs. 10 and 11. As has been already explained, declutching is effected when the clutch cap is set down. When it is set down one of the checks 106 makes contact with the lever 101 in the course of the rotation of the wheel 39, and the motion thus applied to the lever 101 is buffered by the buffer plunger 103 the reaction of the spring 105 returning the lever 101 to the full line position, thus bringing the wheel 39 to stop with the check 106 located in contact with the side of the lever 101 as seen dotted in Fig. 7. Rotation of the wheel 39 is thus always arrested with one of the checks 106 at one certain position. The number of checks 106 placed around the wheel 39 corresponds respectively with the number of deliveries effected by the cap feeder in each rotation of the spindle 38 to which the wheel 39 is keyed. As the first check 106 to arrive in contact with the lever 101 after the clutch has been released corresponds with the position on the cap feeder of the cap forthcoming for delivery from the feeder onto the assembly table, that forthcoming cap is retained on the feeder, as the feeder motion is arrested before it has brought the cap to the delivery position. When, as has been already explained, the clutch is again engaged by the lifting of the cap 50, the lever 101 is lifted up with the cap 50 and so clears the check 106 which it had previously held engaged, then the wheel 39 and consequently the cap feeder is again free to be rotated and is automatically brought into rotation as soon as the clutch has taken up the load.

Referring now to the "no lid, no can type machine," Figs. 14 to 18.

Substantially the same arrangement of mechanism is used in this converse case to provide for the arrest of the motion of the body feeder mechanism when any irregularity or stoppage occurs in the feed of caps. This is explained in Figs. 14 to 18 of the drawings, the corresponding parts being numbered identically throughout. In this case the trigger 71 is located in the path of the caps which are being moved towards the receiving race in the machine by the cap feeder (see Fig. 14), and the clutch mechanism is associated with the drive to the spindle 83 which actuates the body feeder, instead of, as in the previous case, being associated with the spindle 38 through which the cap feeder is driven.

When the machine is started, motion is imparted to the toothed wheel 92 on the spindle 87. The gear wheel 92 on the spindle 87 conveys motion to the gear wheel 39 on the spindle 38 of the cap feeding mechanism, which takes caps one by one from the magazine 33 and advances them in single file to the take-off position for the assembly table. The gear wheel 93 gives motion to the gear wheel 75 on the spindle 42 and causes the slide rod 60 to be reciprocated. The can bodies 72 which are to receive caps 34 are fed as before described. The caps 34 pass the trigger 71 and through it the clutch 41 is controlled in the manner before described. Whilst the feed is regular, the gear wheel 40 is thus engaged to the spindle 42 and motion is transmitted to the gear wheels 96 and 97, which in turn rotates the gear wheels 77 and 84; the gear wheel 77 turns the hollow spindle 78 and the gear wheel 84 turns the spindle 83 of the star wheel 85.

As the present invention is not concerned with the associated parts of the mechanism which relate to the structure of the machine parts other than the feeder, mechanical elements which are shown in the drawings to indicate the connection with those machine elements need not be described.

If the invention is being utilized in a machine in which cans (or bottles or other open containers) are filled with liquid or other product, then the first mentioned arrangement is used, the control being arranged for cutting off the feed of the product instead of arresting a cap feeder action. Any mechanical device may be utilized for this purpose which is dependent upon the rotation of the spindle 38 or a corresponding part for controlling a delivery valve. So long as the mechanism operates automatically to permit the spindle 38 or equivalent part to remain in rotation, the feed of product to the can bodies will not be arrested and the filling of the can bodies will then proceed uninterruptedly subject to the usual feed control, which, as known in the art, includes means for opening a feed valve in proper timing to deliver product to a can which has reached the receiving position in the race and to stop the delivery before the can passes from that place, and in certain cases to retrieve the drip. The arrest of the rotation of the spindle 38 or equivalent part will in this arrangement operate to close a check valve or otherwise control the operation of the feed valve, so that when a can is missing from the train in the race the feed will be interrupted, but will be re-established every time a can comes to the charging position in the race.

It will be readily conceived that like mechanism may be used for effecting the stopping of the can feed mechanism when the supply of product to be charged into the cans is exhausted, but in practice it would be rarely if ever necessary to make provision for this eventuality.

The check 67 at the head of the clutch operating rod 51 is undercut and the notch in the latch 63 which engages is complementarily undercut. When the latch has engaged the clutch rod it remains engaged with it until the end of the downstroke of the rod 51 as the bite of the undercut does not permit the latch to be released from the rod 51 by the action of the spring 65 until the tension on the spring 53 no longer operates and the latch is brought down in the downstroke of the rod 60 so far as to clear the latch mouth from the check 67.

What I claim as my invention and desire to secure by Letters Patent is:—

1. Interlocking drive control means for machines in which a plurality of complementary operations is performed on stock fed into it, comprising a clutch in the drive transmission mechanism of one operative part of the machine; a control device for opening and closing said clutch; a trigger movable by contact with it of incoming stock whilst said stock is passing through the machine; mechanism associated with the trigger for tripping the clutch control device to close it when the trigger is moved by the stock, and to open it when the trigger is not so moved; and mechanism in the primary drive system of the machine for operating said control device obediently to the trigger trip action.

2. Apparatus according to claim 1 wherein the trigger is fitted in a feed race and is moved to cause the closing of the clutch control mechanism only whilst incoming stock is making passing contact with it, and is reset by spring action to cause the opening of the clutch control mechanism at all other times.

3. Apparatus according to claim 1 in which the clutch control mechanism when closed is held closed for the period of one operation of the machine following the tripping action of the trigger mechanism.

4. Apparatus according to claim 1 including a latch on a constantly reciprocated member, a clutch control rod engageable by said latch, a spring arranged for effecting disengagement of said latch, and a member associated with the trigger and arranged to act against said spring to bring said latch into engagement with said control when the trigger is moved by the contact with it of stock passing through the machine.

5. Apparatus according to claim 1, adapted to a can-capping machine, wherein the means for arresting the operation of the machine when the feed of stock is interrupted comprises a trigger in the stock race, a clutch control rod latch, a reciprocating member carrying said latch, and a cam in the driving mechanism for reciprocating said member.

6. The combination with a key clutch having a cap adapted to draw the key when it is set down and to release the key for automatic engagement when it is raised,—of a control rod carrying the clutch cap, a check on said rod engageable with a complementary latch, the latter pivotally mounted on a reciprocating member, a cam on the clutch spindle and a tappet on said member coacting with it to apply reciprocating movement to said member, a spring arranged for disengaging the latch from said member, and an arm on the spindle of a trigger arranged for moving said latch against the spring to engage it with said member, substantially as described.

7. Apparatus according to claim 6, including a bush in the clutch cap and a ramp sided notch cut in said bush, said notch being engageable with the clutch key to retire it and to release it thereby to cause opening or closing of the clutch respectively only whilst said key is passing one certain position in its revolution.

8. Apparatus according to claim 6 in which the latch and engaging member checks are undercut with the object of maintaining their engagement during the reciprocation of the control rod, substantially as described.

9. Apparatus according to claim 6, including an attachment for bringing the driven member of the clutch to a buffered stop at a predetermined position, said attachment comprising a stop on a member which is rotated by the clutch, a buffer carried on a fixed member and an arm carried pivotally on the clutch cap and coacting with said buffer, said arm being brought into the path of the stop when the clutch cap is moved to the position in which disengagement of the clutch takes place.

In testimony whereof he affixes his signature.

SYDNEY STUART.